United States Patent
Yoshibe et al.

(10) Patent No.: US 6,912,358 B2
(45) Date of Patent: Jun. 28, 2005

(54) CAMERA AND LENS BARREL

(75) Inventors: Koushi Yoshibe, Kawasaki (JP);
Yuuichi Katagishi, Setagaya-ku (JP);
Yoshiharu Shiokama, Imba-gun (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/780,771

(22) Filed: Feb. 19, 2004

(65) Prior Publication Data

US 2005/0063693 A1 Mar. 24, 2005

(30) Foreign Application Priority Data

Feb. 21, 2003 (JP) ........................................ 2003-043759

(51) Int. Cl.⁷ ................................................ G03B 3/10
(52) U.S. Cl. ...................... 396/79; 396/103; 396/147; 396/88
(58) Field of Search ............................. 396/79, 80, 103

(56) References Cited

U.S. PATENT DOCUMENTS

| 4,730,201 A | * | 3/1988 | Sasagaki ................. 396/103 |
| 5,227,829 A | * | 7/1993 | Imanari et al. ............ 396/133 |
| 5,815,745 A | * | 9/1998 | Ohsawa ..................... 396/76 |

FOREIGN PATENT DOCUMENTS

| JP | A 6-43353 | 2/1994 | ............ G02B/7/09 |

* cited by examiner

Primary Examiner—W. B. Perkey
(74) Attorney, Agent, or Firm—Oliff & Berridge, PLC

(57) ABSTRACT

At a lens group position storage unit, the positions of a focus lens group and a zoom lens group detected at the time of a preset operation are stored. In response to an instruction for a go-home operation, a zoom lens group position comparison unit compares the current zoom lens group position with the position detected at the time of the preset operation. If the zoom lens group position assumed when the instruction for the go-home operation is issued is further toward the telephoto side relative to the zoom lens group position at the time of the preset operation, a defocus prevention unit issues a warning so as to prevent defocusing.

22 Claims, 4 Drawing Sheets

FIG. 4

| | AT PRESET | AT GO-HOME |
|---|---|---|
| EMBODIMENT | PRESET ENABLED AT ANY ZOOM POSITION | WARNING IS ISSUED IF ZOOM POSITION HAS SHIFTED TOWARD TELEPHOTO SIDE BY SHIFT QUANTITY C OR MORE RELATIVE TO ZOOM POSITION AT PRESET. GO-HOME OPERATION IS EXECUTED. |
| VARIATION -1 | PRESET ENABLED AT ANY ZOOM POSITION | WARNING IS ISSUED IF ZOOM POSITION HAS SHIFTED TOWARD TELEPHOTO SIDE RELATIVE TO ZOOM POSITION AT PRESET. GO-HOME OPERATION IS EXECUTED. |
| VARIATION - 2 | PRESET ENABLED AT ANY ZOOM POSITION | GO-HOME INSTRUCTION IS IGNORED IF ZOOM POSITION HAS SHIFTED TOWARD TELEPHOTO SIDE BY SHIFT QUANTITY C OR MORE RELATIVE TO ZOOM POSITION AT PRESET. WARNING IS ISSUED. |
| VARIATION - 3 | PRESET ENABLED AT ANY ZOOM POSITION | GO-HOME INSTRUCTION IS IGNORED IF ZOOM POSITION HAS SHIFTED TOWARD TELEPHOTO SIDE RELATIVE TO ZOOM POSITION AT PRESET. WARNING IS ISSUED. |
| VARIATION - 4 | PRESET ENABLED ONLY AT TELEPHOTO END. WARNING IS ISSUED AGAINST RESET AT POSITION OTHER THAN TELEPHOTO END. | GO-HOME OPERATION IS EXECUTED |

CAMERA AND LENS BARREL

INCORPORATION REFERENCE

The disclosure of the following priority application is herein incorporated by reference: Japanese Patent Application No. 2003-043759 filed Feb. 21, 2003

BACKGROUND OF THE INVENTION

1. Field of the Invention

The present invention relates to a lens barrel and a camera system having the lens barrel.

2. Description of the Related Art

A photographer taking photographs by using a camera system may frequently focus on a subject located over a specific distance. For instance, at a baseball game, if a runner at first base attempts a steal while the photographer is taking a photograph by focusing on the batter, the photographer needs to instantly refocus the camera system on the runner on his way toward second base.

Japanese Laid Open Patent Publication No. H 6-43353 discloses a lens barrel having a function of resetting whenever necessary, to a focal point position stored in memory in advance in correspondence to a specific distance (hereafter referred to as a go-home function).

In a lens barrel that allows the focal length to be adjusted, the focal point position of the focus lens normally changes between the wide angle end and the telephoto end of the zoom lens. Thus, a photographer using such a lens barrel may not always be able to focus on the desired subject by performing a go-home operation.

SUMMARY OF THE INVENTION

A camera system according to the present invention comprises a focus lens group that executes a focal point adjustment by moving along an optical axis; a drive unit that drives the focus lens group; a focus lens group detection device that detects a position of the focus lens group a long the optical axis; a position storage operation unit operated to store in memory the position of the focus lens group as a preset position; a lens group position storage unit at which at least the position of the focus lens group is stored when an instruction to store the preset position is issued by the position storage operation unit; a position reset operation unit through which an instruction to reset the focus lens group to the preset position stored in memory in response to an operation of the position storage operation unit is issued; and a defocus prevention unit that executes an operation to prevent defocusing when a failure in focusing on a subject is predicted to occur if the focus lens group is reset to the preset position stored in memory through the operation of the position storage operation unit.

It is preferable that a zoom lens group that varies a focal length by moving along the optical axis; and a zoom lens group detection device that detects information indicating a position of the zoom lens group along the optical axis are further provided, results of a detection executed by the zoom lens group detection device are also stored into the lens group position storage unit; and the defocus prevention unit executes the operation to prevent defocusing based upon the results of the detection executed by the zoom lens group detection device.

It is also preferable that a zoom lens group position comparison unit that compares the position of the zoom lens group when the position reset operation unit is operated with the position of the zoom lens group having been stored in the lens group position storage unit in response to the operation of the position storage operation unit, and that the defocus prevention unit executes the operation to prevent defocusing if the position of the zoom lens group when the position reset operation unit is operated is further toward a telephoto side compared to the position of the zoom lens group when the position storage operation unit was operated, based upon results of a comparison executed by the zoom lens group position comparison unit.

The defocus prevention unit may execute the operation to prevent defocusing if the position of the zoom lens group when the position reset operation unit is operated is further toward a telephoto side by a predetermined value or more compared to the position of the zoom lens group when the position storage operation unit was operated, based upon results of a comparison executed by the zoom lens group position comparison unit. It is preferable that the predetermined extent is set to a value at which a focal point position of the focus lens group having been with in a focus determination range used during an autofocus operation, which is set within a focal depth range, does not move out beyond the focal depth range when the zoom lens group shifts toward the telephoto side by the predetermined extent.

It is preferable that the defocus prevention unit executes the operation to prevent defocusing by issuing a warning for a photographer. The defocus prevention unit may execute the operation to prevent defocusing by disallowing a reset operation of the focus lens group. The defocus prevention unit may execute the operation to prevent defocusing by issuing a warning for a photographer if the position of the zoom lens group is not at a telephoto end when the position storage operation unit is operated. The defocus prevention unit may also execute the operation to prevent defocusing by disallowing storage of a lens group position into the lens group position storage unit if the position of the zoom lens group is not at a telephoto end when the position storage operation unit is operated.

A lens barrel according to the present invention comprises a focus lens group that executes a focal point adjustment by moving along an optical axis; a drive unit that drives the focus lens group; a focus lens group detection device that detects a position of the focus lens group a long the optical axis; a position storage operation unit operated to store in memory the position of the focus lens group as a preset position; a lens group position storage unit at which at least the position of the focus lens groups is stored when an instruction to store the preset position is issued by the position storage operation unit; a position reset operation unit through which an instruction to reset the focus lens group to the preset position stored in memory in response to an operation of the position storage operation unit is issued; and a defocus prevention unit that executes an operation to prevent defocusing when a failure in focusing on a subject is predicted to occur if the focus lens group is reset to the preset position stored in memory through the operation of the position storage operation unit.

It is preferable that a zoom lens group that varies a focal length by moving along the optical axis; and a zoom lens group detection device that detects information indicating a position of the zoom lens group along the optical axis are further provided, results of a detection executed by the zoom lens group detection device are also stored into the lens group position storage unit; and the defocus prevention unit executes the operation to prevent defocusing based upon the results of the detection executed by the zoom lens group detection device.

It is preferable that a zoom lens group position comparison unit that compares the position of the zoom lens group when the position reset operation unit is operated with the position of the zoom lens group having been stored in the lens group position storage unit in response to the operation of the position storage operation unit is further provided, and the defocus prevention unit executes the operation to prevent defocusing if the position of the zoom lens group when the position reset operation unit is operated is further toward a telephoto side compared to the position of the zoom lens group when the position storage operation unit was operated, based upon results of a comparison executed by the zoom lens group position comparison unit. The defocus prevention unit may also execute the operation to prevent defocusing if the position of the zoom lens group when the position reset operation unit is operated is further toward a telephoto side by a predetermined value or more compared to the position of the zoom lens group when the position storage operation unit was operated, based upon results of a comparison executed by the zoom lens group position comparison unit. It is preferable that the predetermined extent is set to a value at which a focal point position of the focus lens group having been within a focus determination range used during an autofocus operation, which is set within a focal depth range, does not move out beyond the focal depth range when the zoom lens group shifts toward the telephoto side by the predetermined extent.

It is preferable that the defocus prevention unit executes the operation to prevent defocusing by issuing a warning for a photographer. The defocus prevention unit may execute the operation to prevent defocusing by disallowing a reset operation of the focus lens group. The defocus prevention unit may also execute the operation to prevent defocusing by outputting a signal to be used to warn a photographer to a camera body. The defocus prevention unit may execute the operation to prevent defocusing by outputting a signal to be used to disallow a reset operation of the focus lens group to a camera body.

It is preferable that the defocus prevention unit executes the operation to prevent defocusing by issuing a warning for a photographer, if the position of the zoom lens group is not at a telephoto end when the position storage operation unit is operated. The defocus prevention unit may execute the operation to prevent defocusing by disallowing storage of a lens group position into the lens group position storage unit, if the position of the zoom lens group is not at a telephoto end when the position storage operation unit is operated. The defocus prevention unit may execute the operation to prevent defocusing by outputting a signal used to warn a photographer to the camera body if the position of the zoom lens group is not at a telephoto end when the position storage operation unit is operated. The defocus prevention unit may also execute the operation to prevent defocusing by outputting a signal used to disallow storage of a lens group position into the lens group position storage unit to a camera body, if the position of the zoom lens group is not at a telephoto end when the position storage operation unit is operated.

BRIEF DESCRIPTION OF THE DRAWINGS

FIG. 4 is a table provided to facilitate an explanation of the operations executed to prevent defocusing in variations of the embodiment of the present invention.

DESCRIPTION OF THE PREFERRED EMBODIMENT

The following is an explanation of an embodiment of the present invention, given in reference to drawings.

First, an explanation is given on how the focal point position of a focus lens group changes as the focal length is adjusted with the zoom lens.

Figure 3:
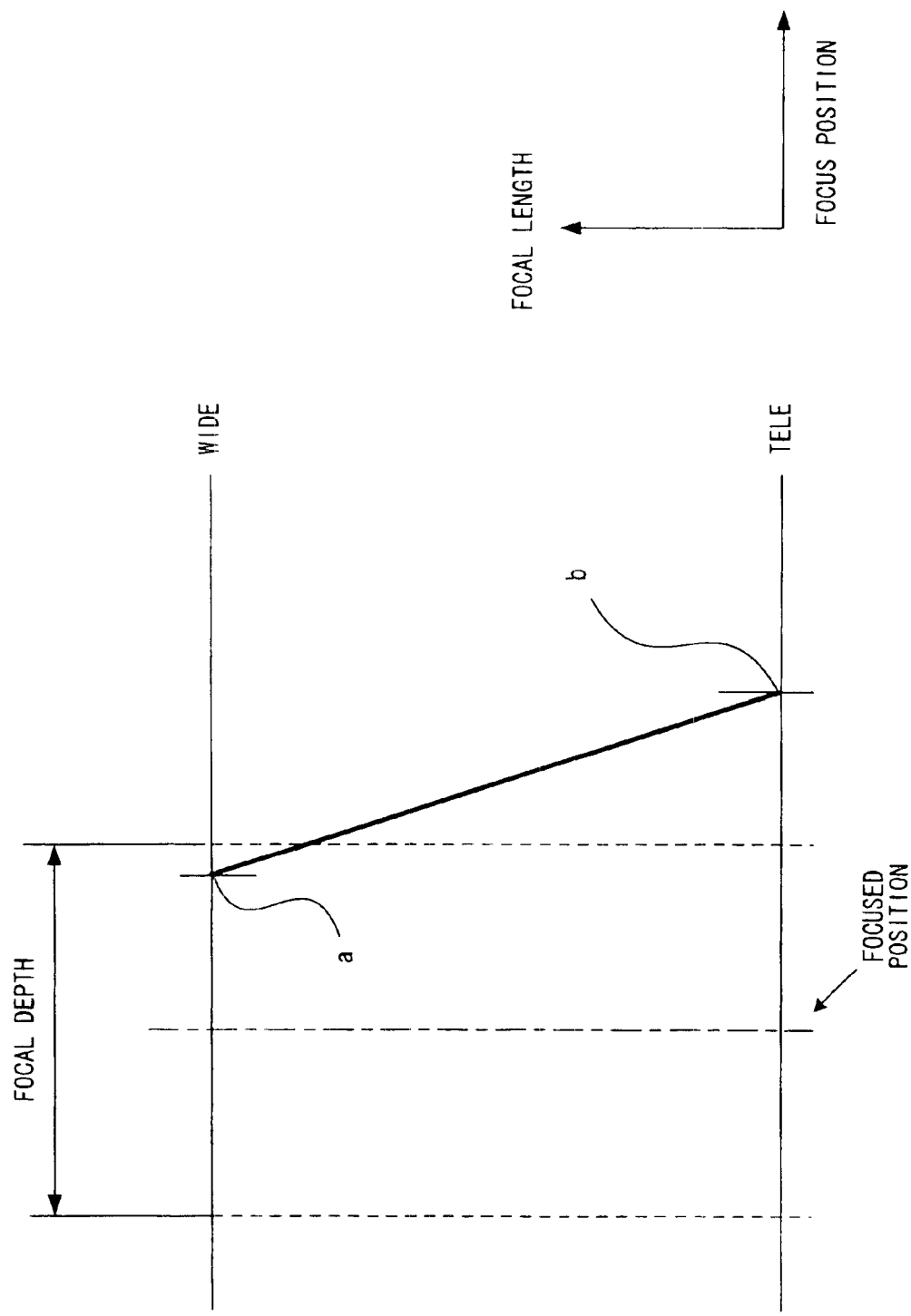
FIG. 3 illustrates a change occurring in the focal point position of the focus lens group at the zoom lens.

FIG. 3 shows a change occurring in the focal point position at a zoom lens. In FIG. 3, the focal length of the zoom lens is indicated along the vertical axis, and the focal point position of the focus lens group is indicated along the horizontal axis.

The one-point chain line in FIG. 3 corresponds to, for instance, the film surface or the image capturing surface in the camera system and indicates the position to which the focal point of the focus lens group should be adjusted (the focus-match position or focused position). Namely, as long as the focal point position of the focus lens group is set to the focused position, the subject present at a specific distance, is in accurate focus. The dotted lines on the two sides of the focused position indicate the focal depth. More specifically, if a focal point position of the focus lens group is within the range enclosed by the dotted lines in FIG. 3, the subject may be considered to be in focus.

The distance between the dotted lines and the one-point chain line in FIG. 3, i.e., the range over which the focus lens group can be considered to be focused on the subject, varies in correspondence to the F number (aperture value). However, this range does not change even when the focal length is adjusted if the F number at the wide angle end at which the focal length is small and the F number at the telephoto end at which the focal length is large are the same. In such a case, the dotted lines and the one-point chain line run parallel to one another as the focal length is changed, as shown in FIG. 3.

In FIG. 3, an example of the focal point position that may be assumed at the focus lens group when the zoom lens is set at the wide angle end is indicated as a point a. Since this point a is located between the one-point chain line and a dotted line, i.e., within the focal depth range, the subject can be regarded as in focus.

As the focus lens group (focusing optical system) moves along the optical axis, the focal point position of the focus lens group, too, shifts. The extent to which the focal point position shifts relative to the distance over which the focus lens group moves generally becomes large as the focal length is set further toward the telephoto side. In other words, the extent to which the image at the focal point position is shifted relative to the distance over which the focus lens group moves along the optical axis is larger on the telephoto side then on the wide angle side.

Thus, since the focal point position of the focus lens group is offset from the focused position indicated by the one-point chain line, the subject is not in exact focus, when the focal point position of the focus lens group is at point a, as shown in FIG. 3. This does not pose any problem in the actual operation as long as the zoom lens is set at the wide angle end, since point a is within the range over which the focus lens group is considered to be in a focused state.

However, when the focal point position of the focus lens group is at point a, a greater extent of defocusing manifests on the telephoto side compared to the wide angle side even if the focal length is adjusted without changing the position of the focus lens group. Namely, even if the focus lens group is held at a fixed position when the camera system is zoomed from the wide angle side to the telephoto side, the extent by which the focal point position is offset from the focused position increases to result in more significant defocusing of the subject.

For instance, the focal point position of the focus lens groups which is at point a at the wide angle end shifts to a point b as the camera is set to the telephoto end through zooming, even when the focus lens group is held at a fixed position, as shown in FIG. 3. In other words, the focal point position at which the focus lens group can be considered to focus on a subject at the wide angle end shifts to point b outside the range of the focal depth at the telephoto end, resulting in defocusing from the subject.

The following problem arises as a result of the change in the focal point position described above during go-home control executed to return as necessary to a focal point position stored in memory in advance in correspondence to a specific distance.

For instance, let us consider a situation in which the focus is adjusted in correspondence to a specific distance with a zoom position set at the wide angle end and the focal point position (point a in FIG. 3) is stored in memory (preset). As the go-home control is executed subsequently, the focal point position of the focus lens group is reset to point a. However, if the go-home control is executed while the zoom position is at the telephoto end, the focal point position initially set at point a shifts to point b, which is outside the focused range. If the photographer takes pictures without realizing that the focal point position has changed, the resulting pictures will not achieve a sharp focus.

Accordingly, preventive measures are taken in the embodiment of the present invention to disallow photographing of an unfocused picture under the go-home control if there is any like lihood of the focus lens group not achieving a focused state due to a change in the zoom position.

Figure 1:
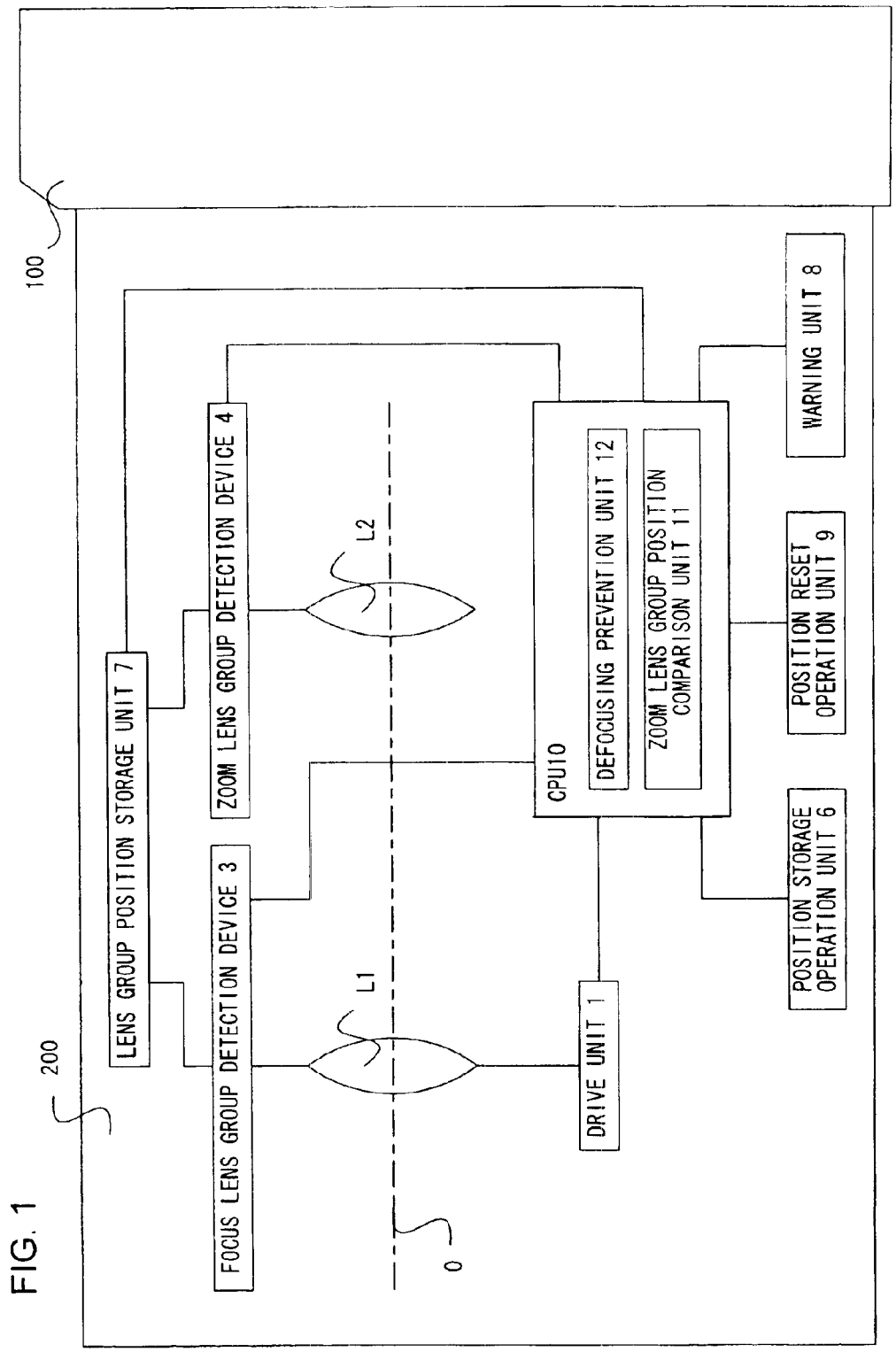
FIG. 1 is a block diagram of a camera system having a lens barrel achieved in an embodiment of the present invention.
Figure 2:
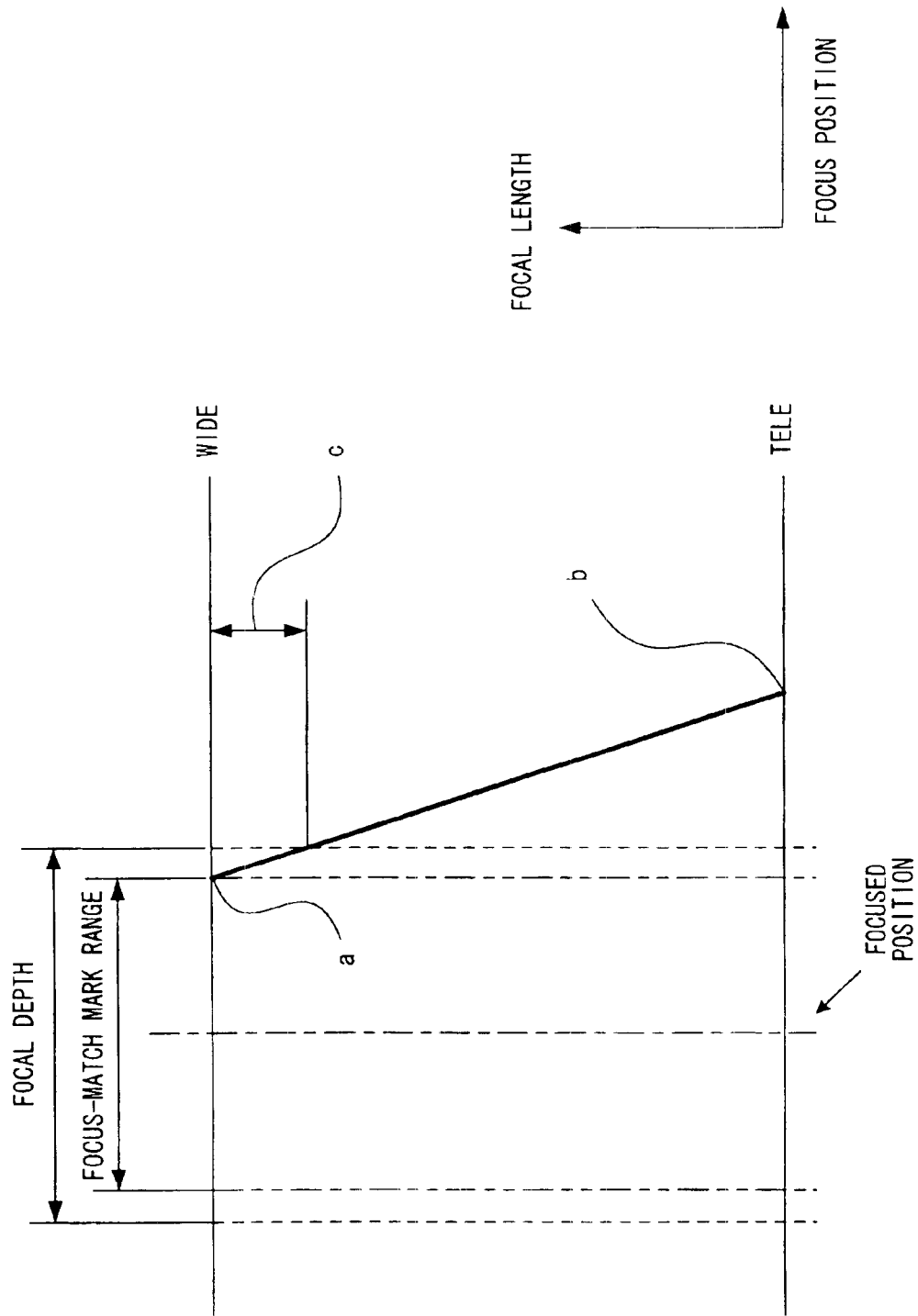
FIG. 2 illustrates a change in the focal point position of the focus lens group in the lens barrel achieved in the embodiment.

The following is a detailed explanation of the embodiment of the present invention, given in reference to FIGS. 1 and 2.

FIG. 1 is a block diagram of a camera system having a lens barrel achieved in the embodiment of the present invention.

The camera system in the embodiment includes a camera body 100 and a lens barrel 200 that can be detachably mounted at the camera body 100.

The lens barrel 200 includes a focus lens group L1, a zoom lens group L2, a drive unit 1, a focus lens group detection device 3, a zoom lens group detection device 4, a position storage operation unit 6, a lens group position storage unit 7, a warning unit 8, a position reset operation unit 9, a CPU 10 and the like.

The focus lens group L1 performs a focusing operation as it moves along an optical axis O. The focus lens group L1 is driven by the drive unit 1.

The zoom lens group L2 changes the focal length (zoom position) as it moves along the optical axis O. In the embodiment, the zoom lens group L2 is caused to move by a drive force imparted as the photographer manually operates a focus ring (not shown).

The drive unit 1, which is controlled by the CPU 10, drives the focus lens group L1.

The focus lens group detection device 3 detects the position of the focus lens group L1 along the optical axis O. Information indicating the position of the focus lens group L1 detected by the focus lens group detection device 3 is provided to the lens group position storage unit 7 and the CPU 10.

The zoom lens group detection device 4 detects the position of the zoom lens group L2 along the optical axis O. Information indicating the position of the zoom lens group L2 detected by the zoom lens group detection device 4 is provided to the lens group position storage unit 7 and the CPU 10.

The position storage operation unit 6 is an operating member operated by the user to store in memory (preset) a position of the focus lens group L1. The position storage operation unit 6 may be constituted as, for instance, a switch disposed at the external circumference of the lens barrel 200. As the position storage operation unit 6 is operated, the current position of the focus lens group L1 is stored in memory as a preset position.

The lens group position storage unit 7 stores the values output by the focus lens group detection device 3 and the zoom lens group detection device 4 in response to an operation of the position storage operation unit 6.

The warning unit 8, which is controlled by the CPU 10, issues a warning for the photographer in the form of an audio warning, a visual display or the like. The warning operation executed at the warning unit 8 is to be described in detail later.

The position reset operation unit 9 is an operating member operated to reset the focus lens group L1 to the preset position having been set through the operation of the position storage operation unit 6. The position reset operation unit 9, which maybe a switch disposed at the external circumference of the lens barrel 200, is operated by the user to issue an instruction for a go-home control start.

The CPU 10 constituting a control unit that controls the operations executed in the lens barrel 200, is capable of communicating with a camera-side CPU (not shown) provided at the camera body 100 via a communication device (not shown) The CPU 10 includes a zoom lens group position comparison unit 11 and a defocus prevention unit 12. The zoom lens group position comparison unit 11 and the defocus prevention unit 12 may be achieved in, for instance, software at the CPU 10.

The zoom lens group position comparison unit 11 compares the value output from the zoom lens group detection device 4 when the position of the focus lens group is preset through the operation of the position storage operation unit 6 and a value output from the zoom lens group detection device 4 when the position reset operation unit 9 is operated.

Based upon the results of the comparison executed by the zoom lens group position comparison unit 11, the defocus prevention unit 12 executes an operation to stop an unfocused photograph being taken if there is a likelihood that an out-of-focus image will result.

Next, the operations of the lens barrel 200 and the camera system executed in the embodiment are explained.

In this example, a baseball game is being photographed by using the camera system.

Lets us hypothesize that the photographer is ready to shoot with the camera system set on a tripod in the press box on the first base side or on the third base side. Since he is likely to be frequently photographing the action at second base during the game, the photographer presets the focal point position at second base before the game.

More specifically, the photographer focuses on second base through auto focusing or manual focusing. After focusing on second base, the photographer operates the position storage operation unit 6. In response to the operation of the position storage operation unit 6, the lens group position storage unit 7 stores in memory the value detected by the focus lens group detection device 3 in correspondence to the position of the focus lens group L1. At the same time, the lens group position storage unit 7 stores in memory the value detected by the zoom lens group detection device 4 in correspondence to the position of the zoom lens group L2.

Subsequently, if the photographer needs to photograph a subject at second base quickly during the game, he operates the position reset operation unit 9. In response to the operation of the position reset operation unit 9, the CPU 10 extracts the data indicating the focal point position corresponding to second base which was preset prior to the game from the lens group position storage unit 7 and then outputs a command to the drive unit 1 to drive the focus lens group L1 to the preset position, i.e., the position at which the focus lens group is focused on second base.

In this situation, if the focal point position has been preset through an operation of the position storage operation unit 6 at the wide angle side zoom position and the photographer attempts to take a photograph by implementing the go-home control through an operation of the position reset operation unit 9 at the telephoto side zoom position, the resulting photograph may be out of focus.

Accordingly, a decision is made at the defocus prevention unit 12 as to whether or not there is any risk of defocusing, and preventive measures are taken if the defocus prevention unit 12 judges that the there is a defocusing risk.

The following is an explanation of the decision made by the defocus prevention unit 12 as to whether or not there is a defocusing risk and the measures taken to prevent defocusing.

FIG. 2 shows a change in the focal point position occurring in the lens barrel 200. The one-point chain line in FIG. 2 corresponds to, for instance, the film surface or the image capturing surface in the camera system and indicates the focused position at which the focus lens group is accurately focused on the subject. The dotted lines on the two sides of the one-point chain line indicate the range corresponding to the focal depth. If the focal point position of the focus lens group L1 is within the range enclosed by the dotted lines, i.e., within the focal depth range, the subject may be considered to be in focus.

The two-point chain lines set further inward relative to the focal depth enclosed by the dotted lines indicate the range over which it is judged that a focus on a subject is achieved through an autofocus operation. Since a focus match mark is displayed to indicate that the camera system has focused on a subject through an autofocus operation, this range is referred to as a focus match mark range. In order to ensure that the focus lens group is focused on the subject with a high degree of reliability, the focus match mark range is set narrower than the focal depth range.

Thus, the focal point position of the focus lens group L1, which is almost at the limit of the focus match mark range at point a when the zoom lens is set at the wide angle end, remains inside the focal depth range until the zoom position moves by a shift quantity c. Namely, if the position of the focus lens group L1 corresponding to the focal point position at point a is preset at the wide angle end, a focused image can be photographed under the go-home control until the zoom position shifts from the wide angle end by the shift quantity c.

In the embodiment, the shift quantity c shown in FIG. 2 is set as a margin (allowable range) to provide an operating margin. It is to be noted that the margin (shift quantity c) of the zoom position changes in correspondence to the preset focal point position of the focus lens group L1. For instance, if the preset focal point position is very close to the focused position, the focal point position of the focus lens group L1 can shift over a large margin within the focal depth range and thus, the shift quantity c increases. In short, the shift quantity c represents the degree to which the zoom lens group L2 is allowed to move before the focal point position of the focus lens group L1 preset within the focus match mark range reaches the limit of the focal depth.

Based upon the results of the comparison executed by the zoom lens group position comparison unit 11, the defocus prevention unit 12 makes a decision as to whether or not there is any defocusing risk. In other words, it judges that there is a defocusing risk if the position of the zoom lens group L2 when an instruction for the go-home control is issued is further toward the telephoto side than the position of the zoom lens group L2 at the time of the preset operation and the difference between these positions exceeds the shift quantity c. If it is judged that there is a defocusing risk, the defocus prevention unit 12 executes an operation to prevent defocusing.

As described above, the defocus prevention unit 12 judges that there is a defocusing risk and executes an operation to prevent defocusing when the zoom position shifts toward the telephoto side relative to the zoom position at the time of the preset operation over a distance exceeding the shift quantity c.

In the embodiment, the defocus prevention unit 12 issues a warning for the photographer via the warning unit 8 to prevent defocusing. More specifically, it generates a warning sound through the warning unit provided at the lens barrel 200, thereby alerting the photographer to the defocusing risk. This prevents the photographer from taking a picture without realizing that there is a defocusing risk. It is to be noted that a warning may also be provided at a display unit or a light emitting unit (not shown) of the camera body 100, together with the warning sound generated through the warning unit 8.

In the embodiment, the go-home operation itself is executed even when the defocus prevention unit 12 issues a warning to alert the photographer to the defocusing risk. Thus, if the photographer still wishes to take a photograph by performing a fine focus adjustment following the go-home operation or if the photographer is willing to photograph an image that is slightly unfocused, he is allowed to proceed with the photographing operation without missing the photo opportunity.

As explained above, in the embodiment, the photographer is alerted to a defocusing risk through the go-home control, before he takes a picture. Accordingly, the photographer can perform a focusing operation again after the go-home operation or adjust the zoom position to photograph a focused image. As a result, the photographer can take pictures spontaneously by using a camera system mounted with a zoom lens.

If the position of the zoom lens group L2 shifts toward the telephoto side by the shift quantity c or more relative to the position assumed by the zoom lens group L2 at the time of the preset operation, the defocus prevention unit 12 judges that there is a defocusing risk. As a margin is allowed with regard to the range over which the zoom position is allowed to shift, the defocus prevention unit 12 is enabled to make the defocusing decision without becoming too sensitive to tolerate a certain extent of shift in the zoom position, which assures smooth operability.

If the shift quantity c was not set as a margin, a warning or the like would be issued by the defocus prevention unit 12 when the photographer initiated a go-home operation without realizing that the zoom position had shifted very slightly toward the telephoto side relative to the zoom position at the time of the preset operation.

It is to be noted that in the embodiment, the shift quantity c over which the focal point position at a limit of the focus match mark range still remains within the focal depth range even as the zoom position is shifted toward the telephoto side is set as the margin. For this reason, a focused image can be photographed under the go-home control as long as no warning is issued by the defocus prevention unit 12 even if the zoom position has shifted further toward the telephoto side.

(Variations)

The lens barrel and the camera system according to the present invention are not limited to those explained in reference to the embodiment, and they allow for numerous changes and modifications which will be considered to be equally within the range of the present invention.

If the zoom position has shifted toward the telephoto side from the zoom position at the time of the preset operation over a distance exceeding the shift quantity c, a warning is issued in order to prevent defocusing but the go-home operation itself is still executed in the embodiment explained above. The present invention is not limited to this example, and defocusing may be prevented by adopting any of the various alternative modes, as shown in FIG. 4.

In variation-1, a warning is issued if the zoom position has shifted even slightly toward the telephoto slide relative to the zoom position at the time of the preset operation when an instruction for the go-home operation is issued. In this case, a more rigorous criterion is adopted in the decision-making for a defocusing risk.

In variation-2, a defocusing risk is judged as in the embodiment explained earlier. Upon judging that there is a defocusing risk, the defocus prevention unit 12 issues a warning through the warning unit 8 and, at the same time, it outputs a signal that disallows the return of the focus lens group L2 to the preset position to the drive unit 1 by disregarding the go-home instruction. Since the subject image itself in the viewfinder or on a monitor remains considerably unfocused under these circumstances, even the photographer intent on the photographing operation can be alerted to the change in the zoom position with a high degree of reliability.

In variation-3, a warning is issued if the zoom position has shifted even slightly toward the telephoto side relative to the zoom position at the time of the preset operation when an instruction for the go-home operation is issued, and the focus lens group L2 is not reset to the preset position by ignoring the go-home instruction.

In variation-4, a focal point position can only be preset for the go-home control if the zoom position is at the telephoto end, and a preset operation is not enabled at other zoom positions. In this case, the zoom position is never further toward the telephoto side relative to the zoom position at the time of the preset operation when an instruction for the go-home operation is issued. Accordingly, the go-home operation is executed invariably in response to an instruction for the go-home operation. It is to be noted that based upon the signal provided by the zoom lens group detection device 4 when the position storage operation unit 6 is operated, the defocus prevention unit 12 outputs a signal disallowing or allowing a preset of the lens group position to the lens group position storage unit 7.

In the embodiment explained earlier, the operation for preventing defocusing is executed at the lens barrel 200. Defocusing may be prevented by, for instance, issuing a warning for the photographer, disallowing a reset operation of the focus lens group L2 to the preset position or disallowing storage of the lens group position. However, the defocus prevention unit 12 may instead prevent defocusing by, for instance, transmitting a signal used to warn the photographer to the camera body 100, transmitting a signal disallowing a reset operation of the focus lens group L2 to the camera body 100 or transmitting a signal disallowing storage of the lens group position at the lens group position storage unit 7 to the camera body 100, as well.

As explained in detail, the following advantages are achieved in the embodiment described above.

(1) The defocus prevention unit 12 executes an operation to prevent defocusing when it is judged that a focus on a subject will not be achieved by resetting the focus lens group L2 to the preset position stored in memory by operating the position storage operation unit 6. As a result, it is ensured that the photographer does not inadvertently take an unfocused picture It is to be noted that while the zoom lens group L2 is provided as part of the lens barrel 200 in the embodiment described above, it goes without saying the present invention may be adopted in a lens barrel with a single focal point with a fixed focal length in which the focal depth is varied, for instance, in accordance with a change in the aperture setting.

(2) Since the defocus prevention unit 12 executes the operation to prevent defocusing based upon the results of the detection executed by the zoom lens group detection device 4, defocusing due to a shift in the focal point position occurring as the zoom position changes can be prevented. It is to be noted that the zoom lens group detection device 4 detects the position of the zoom lens group L2 in the embodiment described above. However, the present invention is not limited to this example and the zoom lens group detection device 4 may detect a displacement of the position of the zoom lens group L2 when an instruction for the go-home operation is issued relative to the position of the zoom lens group L2 at the time of the preset-operation. Namely, the zoom lens group detection device 4 should detect positional information that may indicate either the position or the displacement of the zoom lens group L2.

(3) The defocus prevention unit 12 executes the operation to prevent defocusing if the position of the zoom lens group L2 when the position reset operation unit 9 is operated (the position of the zoom lens group when an instruction for the go-home operation is issued) is further toward the telephoto side relative to the position of the zoom lens group L2 (preset position) having been stored into the lens group position storage unit 7 in response to an operation of the position storage operation unit 6, based upon the results of the comparison executed by the zoom lens group position comparison unit 11. Consequently, defocusing, which would result from a shift in the focal point position due to a change in the zoom position can be prevented.

(4) The defocus prevention unit 12 executes the operation to prevent defocusing if the position of the zoom lens group L2 when the position reset operation unit 9 is operated is further toward the telephoto side by a specific extent (shift quantity c) or more relative to the position of the zoom lens group L2 having been stored into the lens group position storage unit 7 in response to an operation of the position storage operation unit 6, based upon the results of the comparison executed by the zoom lens group position comparison unit 11. As a result, the defocus prevention operation is disallowed if the photographer inadvertently fails to adjust the zoom position exactly at the initial position detected at the time of the preset operation, to assure smooth operability.

(5) The shift quantity c (margin) is set at such a value that when the zoom lens group L2 shifts toward the telephoto side by the shift quantity c, the focal point position of the focus lens group L1 having been within the focus determination range (focus match mark range) used during an autofocus operation does not move out beyond the focus match limit, i.e., the focal depth range. As a result, a focused image can be photographed with a camera achieving a high level of operability. It is to be noted that the focal depth does not change between the wide angle end and the telephoto end in the embodiment described above, as shown in FIG. 2. However, the shift quantity c should be set to an appropriate value when the focal depth changes in correspondence to the focal length, as well, by ensuring that the focal point position of the focus lens group L1 does not move beyond the focal depth range when the zoom lens group L2 is shifted toward the telephoto side.

(6) The defocus prevention unit 12 prevents defocusing by warning the photographer and/or by disallowing a reset operation of the focus lens group L2. As a result, if there is a defocusing risk when the focus lens group L2 is to be reset to the preset position, the photographer is duly warned.

(7) If the zoom lens group L2 is set at a position other than the telephoto end when the position storage operation unit 6 is operated, the defocus prevention unit 12 issues a warning for the photographer to prevent defocusing, and/or disallows storage of the lens group position at the lens group position storage unit 7. Thus, defocusing can be prevented with an even higher degree of reliability.

The above-described embodiments are examples, and various modifications can be made without departing from the spirit and scope of the invention.

What is claimed is:

1. A camera system comprising:
   a focus lens group that executes a focal point adjustment by moving along an optical axis;
   a drive unit that drives the focus lens group;
   a focus lens group detection device that detects a position of the focus lens group along the optical axis;
   a position storage operation unit operated to store in memory the position of the focus lens group as a preset position;
   a lens group position storage unit at which at least the position of the focus lens group is stored when an instruction to store the preset position is issued by the position storage operation unit;
   a position reset operation unit through which an instruction to reset the focus lens group to the preset position stored in memory in response to an operation of the position storage operation unit is issued; and
   a defocus prevention unit that executes an operation to prevent defocusing when a failure in focusing on a subject is predicted to occur if the focus lens group is reset to the preset position stored in memory through the operation of the position storage operation unit.

2. A camera system according to claim 1, further comprising:
   a zoom lens group that varies a focal length by moving along the optical axis; and
   a zoom lens group detection device that detects information indicating a position of the zoom lens group along the optical axis, wherein:
   results of a detection executed by the zoom lens group detection device are also stored into the lens group position storage unit; and
   the defocus prevention unit executes the operation to prevent defocusing based upon the results of the detection executed by the zoom lens group detection device.

3. A camera system according to claim 2, further comprising:
   a zoom lens group position comparison unit that compares the position of the zoom lens group when the position reset operation unit is operated with the position of the zoom lens group having been stored in the lens group position storage unit in response to the operation of the position storage operation unit, wherein:
   the defocus prevention unit executes the operation to prevent defocusing if the position of the zoom lens group when the position reset operation unit is operated is further toward a telephoto side compared to the position of the zoom lens group when the position storage operation unit was operated, based upon results of a comparison executed by the zoom lens group position comparison unit.

4. A camera system according to claim 2, further comprising:
   a zoom lens group position comparison unit that compares the position of the zoom lens group when the position reset operation unit is operated with the position of the zoom lens group having been stored in the lens group position storage unit in response to the operation of the position storage operation unit, wherein;
   the defocus prevention unit executes the operation to prevent defocusing if the position of the zoom lens group when the position reset operation unit is operated is further toward a telephoto side by a predetermined value or more compared to the position of the zoom lens group when the position storage operation unit was operated, based upon results of a comparison executed by the zoom lens group position comparison unit.

5. A camera system according to claim 4, wherein:
   the predetermined extent is set to a value at which a focal point position of the focus lens group having been within a focus determination range used during an autofocus operation, which is set within a focal depth range, does not move out beyond the focal depth range when the zoom lens group shifts toward the telephoto side by the predetermined extent.

6. A camera system according to claim 1, wherein:
   the defocus prevention unit executes the operation to prevent defocusing by issuing a warning for a photographer.

7. A camera system according to claim 1, wherein:
   the defocus prevention unit executes the operation to prevent defocusing by disallowing a reset operation of the focus lens group.

8. A camera system according to claim 2, wherein:
   the defocus prevention unit executes the operation to prevent defocusing by issuing a warning for a photographer if the position of the zoom lens group is not at a telephoto end when the position storage operation unit is operated.

9. A camera system according to claim 2, wherein:

the defocus prevention unit executes the operation to prevent defocusing by disallowing storage of a lens group position into the lens group position storage unit if the position of the zoom lens group is not at a telephoto end when the position storage operation unit is operated.

10. A lens barrel comprising:

a focus lens group that executes a focal point adjustment by moving along an optical axis;

a drive unit that drives the focus lens group;

a focus lens group detection device that detects a position of the focus lens group along the optical axis;

a position storage operation unit operated to store in memory the position of the focus lens group as a preset position;

a lens group position storage unit at which at least the position of the focus lens groups is stored when an instruction to store the preset position is issued by the position storage operation unit;

a position reset operation unit through which an instruction to reset the focus lens group to the preset position stored in memory in response to an operation of the position storage operation unit is issued; and a defocus prevention unit that executes an operation to prevent defocusing when a failure in focusing on a subject is predicted to occur if the focus lens group is reset to the preset position stored in memory through the operation of the position storage operation unit.

11. A lens barrel according to claim 10, further comprising:

a zoom lens group that varies a focal length by moving along the optical axis; and a zoom lens group detection device that detects information indicating a position of the zoom lens group along the optical axis, wherein:

results of a detection executed by the zoom lens group detection device are also stored into the lens group position storage unit; and the defocus prevention unit executes the operation to prevent defocusing based upon the results of the detection executed by the zoom lens group detection device.

12. A lens barrel according to claim 11, further comprising:

a zoom lens group position comparison unit that compares the position of the zoom lens group when the position reset operation unit is operated with the position of the zoom lens group having been stored in the lens group position storage unit in response to the operation of the position storage operation unit, wherein:

the defocus prevention unit executes the operation to prevent defocusing if the position of the zoom lens group when the position reset operation unit is operated is further toward a telephoto side compared to the position of the zoom lens group when the position storage operation unit was operated, based upon results of a comparison executed by the zoom lens group position comparison unit.

13. A lens barrel according to claim 11, further comprising:

a zoom lens group position comparison unit that compares the position of the zoom lens group when the position reset operation unit is operated with the position of the zoom lens group having been stored in the lens group position storage unit in response to the operation of the position storage operation unit, wherein;

the defocus prevention unit executes the operation to prevent defocusing if the position of the zoom lens group when the position reset operation unit is operated is further toward a telephoto side by a predetermined value or more compared to the position of the zoom lens group when the position storage operation unit was operated, based upon results of a comparison executed by the zoom lens group position comparison unit.

14. A lens barrel according to claim 13, wherein:

the predetermined extent is set to a value at which a focal point position of the focus lens group having been within a focus determination range used during an autofocus operation, which is set within a focal depth range, does not move out beyond the focal depth range when the zoom lens group shifts toward the telephoto side by the predetermined extent.

15. A lens barrel according to claim 10, wherein:

the defocus prevention unit executes the operation to prevent defocusing by issuing a warning for a photographer.

16. A lens barrel according to claim 10, wherein:

the defocus prevention unit executes the operation to prevent defocusing by disallowing a reset operation of the focus lens group.

17. A lens barrel according to claim 10, wherein:

the defocus prevention unit executes the operation to prevent defocusing by outputting a signal to be used to warn a photographer to a camera body.

18. A lens barrel according to claim 10, wherein:

the defocus prevention unit executes the operation to prevent defocusing by outputting a signal to be used to disallow a reset operation of the focus lens group to a camera body.

19. A lens barrel according to claim 11, wherein:

the defocus prevention unit executes the operation to prevent defocusing by issuing a warning for a photographer, if the position of the zoom lens group is not at a telephoto end when the position storage operation unit is operated.

20. A lens barrel according to claim 11, wherein:

the defocus prevention unit executes the operation to prevent defocusing by disallowing storage of a lens group position into the lens group position storage unit, if the position of the zoom lens group is not at a telephoto end when the position storage operation unit is operated.

21. A lens barrel according to claim 11, wherein:

the defocus prevention unit executes the operation to prevent defocusing by outputting a signal used to warn a photographer to the camera body if the position of the zoom lens group is not at a telephoto end when the position storage operation unit is operated.

22. A lens barrel according to claim 11, wherein:

the defocus prevention unit executes the operation to prevent defocusing by outputting a signal used to disallow storage of a lens group position into the lens group position storage unit to a camera body, if the position of the zoom lens group is not at a telephoto end when the position storage operation unit is operated.

* * * * *